W. F. CONVERSE, R. H. PENNY & R. S. HANNAFORD.
CUTTING SCREWS ON THE RAILS OF BEDSTEADS.
No. 3,872. Patented Dec. 31, 1844.
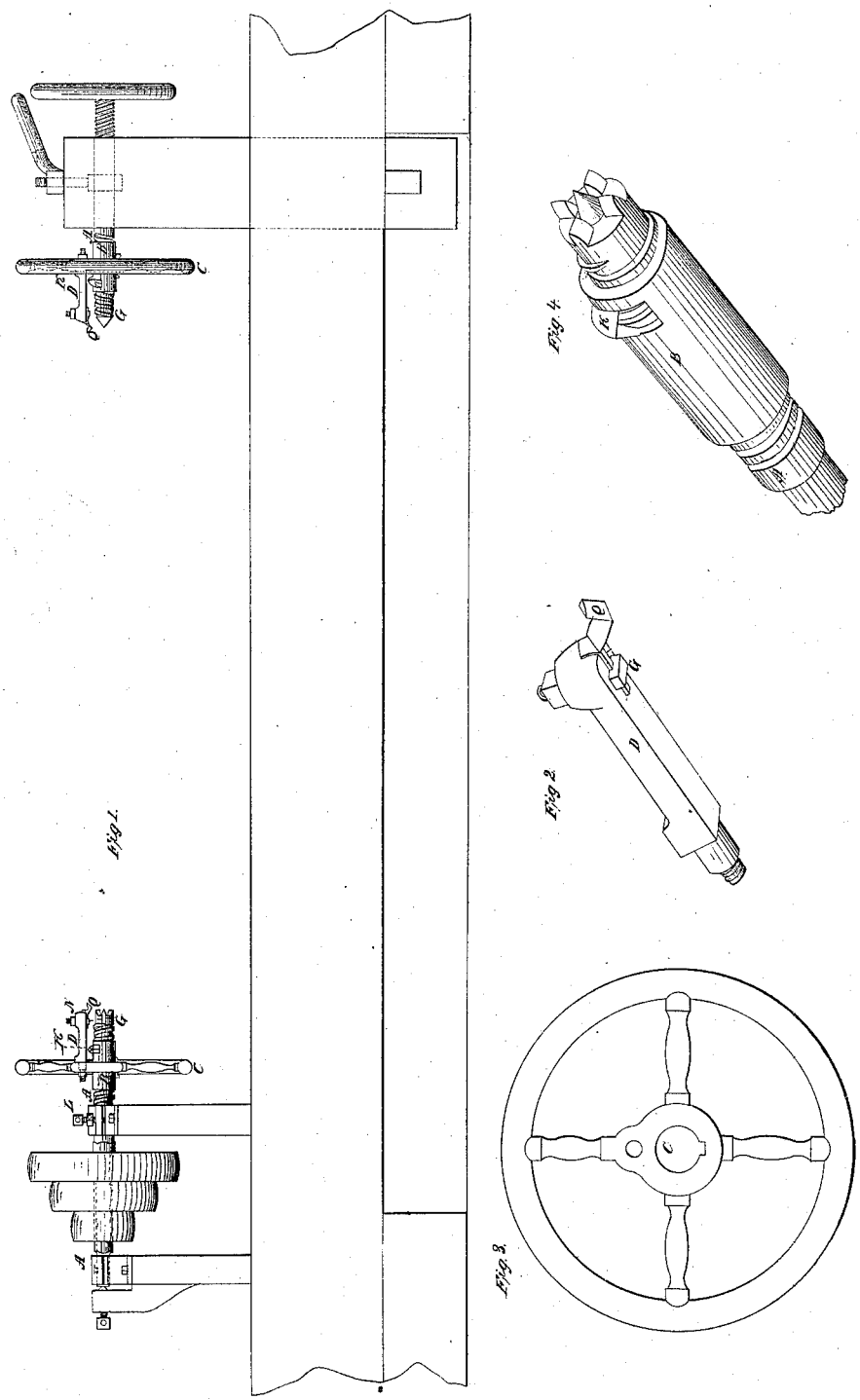

UNITED STATES PATENT OFFICE.

W. F. CONVERSE, R. H. PENNY, AND R. S. HANNAFORD, OF HARRISON, OHIO.

MACHINERY FOR CUTTING SCREWS IN THE POSTS AND ON THE RAILS OF BEDSTEADS.

Specification of Letters Patent No. 3,872, dated December 31, 1844.

*To all whom it may concern:*

Be it known that we, WILLIAM F. CONVERSE, RICHARD H. PENNY, and RICHARD S. HANNAFORD, of Harrison, in the county of Hamilton and State of Ohio, have invented a new and useful Improvement in the machinery for the cutting of the screws in the posts and upon the rails of bedsteads and for other purposes, which is described as follows, reference being had to the annexed drawings of the same, making part of this specification.

Figure 1 is an elevation of a common turning lathe showing the additional appendages for cutting the screws on the rails and in the posts of bedsteads. Fig. 2 is a perspective view of the arm D drawn on a larger scale than in Fig. 1 in order to show the cutter more clearly. Fig. 3 is an elevation of the wheel C to which the arm D is attached drawn on a larger scale than in Fig. 1 and detached from the lathe. Fig. 4 is a perspective view of the mandrel A, socket B, and cutter K for cutting the screws in the posts, also drawn to a larger scale than the same parts in Fig. 1.

The annexed drawing represents a common lathe for turning wood with the machinery thereto attached (which we claim as our invention) for cutting screws upon the rails, and in the posts of bedsteads.

A' A' are the mandrels of the lathe terminating at the ends with right and left hand screws the distances of whose threads correspond with those required to be cut in the posts and upon the rails of bedsteads. B B are sockets with screws cut through them corresponding with those directly upon the mandrels A' A' and of the size of the holes in the posts before the threads are cut and in which sockets the knives K are dovetailed and used for cutting the screws in the posts. C C are cast iron wheels about 12 inches in diameter fitted upon the sockets B B and fastened by a key or wedge in such a manner that they can be moved back and forth, as occasion may require, for adjusting the distance of the knives from each other as the length of the screws to be cut may require.

D D are arms about 4 inches in length carrying knives on one end for cutting the threads of the screws upon the ends of the rails, the other ends of the arms passing through the wheels C C with round tenons and fastened by nuts at the ends, and so adjusted that as the knives wear by use or become shorter by sharpening the arms can be turned so as to keep the edges of the knives upon the right line thereby cutting a more perfect thread than could otherwise be done. G G are loops passing through the arms D D through these loops the shanks or arms of the knives Q are inserted, and by being mortised into the arms D D, are held firm and permanent by the nuts N or screws upon the upper ends of the loops, affording a facility for raising or lowering the knives at pleasure.

L is a screw terminating in a point which when the rail is turned is screwed down upon the mandrel A which prevents that mandrel from turning; the wheels C C are then turned by hand the arms D D revolving around the ends of the rails and the knives Q cutting the screws on the rails. In cutting the screws in the posts the arms D D are taken out of the wheels C C—the wheels are then moved back on their sockets B B to the ends opposite to the knives K and there fastened; a block of wood is then fastened in the bench of the lathe for the post to press against; the wheels C C are then, turned until the ends of the sockets enter the holes in the posts as far as the knives thus holding the post permanent* until the screws are cut, which is done by revolving the wheels in the same manner as in cutting the rails. The knives in the sockets pass over the ends of the mandrels before they commence cutting and the chips or the wood which is cut out pass into the center of the sockets and are forced out by turning them back upon the mandrels.

When the lathe is required to be used for other kinds of work the sockets with all their appendages can be run off the mandrels and the lathe left perfectly clear for any other kind of turning or by the application of other mandrels, the whole machine can be used separate and apart from the lathe.

The knife Q attached to the end of the arm D is made to revolve by a crank or wheel C around the ends of the rails—the knife being so arranged that it can be set toward or from the center or raised or lowered according to the depth of thread required to be cut.

The socket B and knife K that cuts the thread in the posts are arranged in such a way that the knife can be taken out and sharpened and new ones inserted with but little expense, the knives likewise cut a smooth thread and much easier than the tap with a screw cut upon it which is commonly used in cutting screws in bedposts. The socket and screw shaft or mandrel are arranged in such a way that the same screw serves as a guide for both cutting the screws upon the rails and in the posts, thereby making the transfer precisely alike in both screws and consequently adding to their durability and strength; and finally the application of the screws and sockets, with all their appendages to the mandrels of a common lathe thereby saving nearly one half the expense of other machines for a similar purpose and affording advantages for doing the same amount of labor in much less time and more perfect than in the usual method; the screws being cut upon the rails by this machine while they are suspended upon the same centers upon which they are turned is likewise a great advantage.

The cutters K are in the form of a V and have throats in front extending through the sockets to the interior thereof. In cutting the screws in the post the chips pass through the said throats into the interior of the socket as the said cutter leaves the outer end of the screw-mandrel. They are discharged as the socket returns.

What we claim as our invention is—

1. Combining the sockets and cutters for cutting the screws on the rails, and in the posts with the mandrels of a lathe for turning wood, in the manner and for the purpose substantially as described.

2. We also claim attaching the cutters for cutting the screws on the ends of the rails, to a socket, which works on a screw or mandrel so that the length of screw is cut beyond the socket, and thus the necessity of running the threads of the socket into the threads cut is avoided as herein fully de- 3. And finally we claim attaching the V cutter for cutting the threads in the post on the outer periphery of a socket having a female screw working on a screw or mandrel, as herein described, and for the purpose fully set forth.

WM. F. CONVERSE.
RICHARD H. PENNY.
RICHARD S. HANNAFORD.

Witnesses:
 JOHN ASHLEY,
 WILLIAM L. THOMPSON.